UNITED STATES PATENT OFFICE.

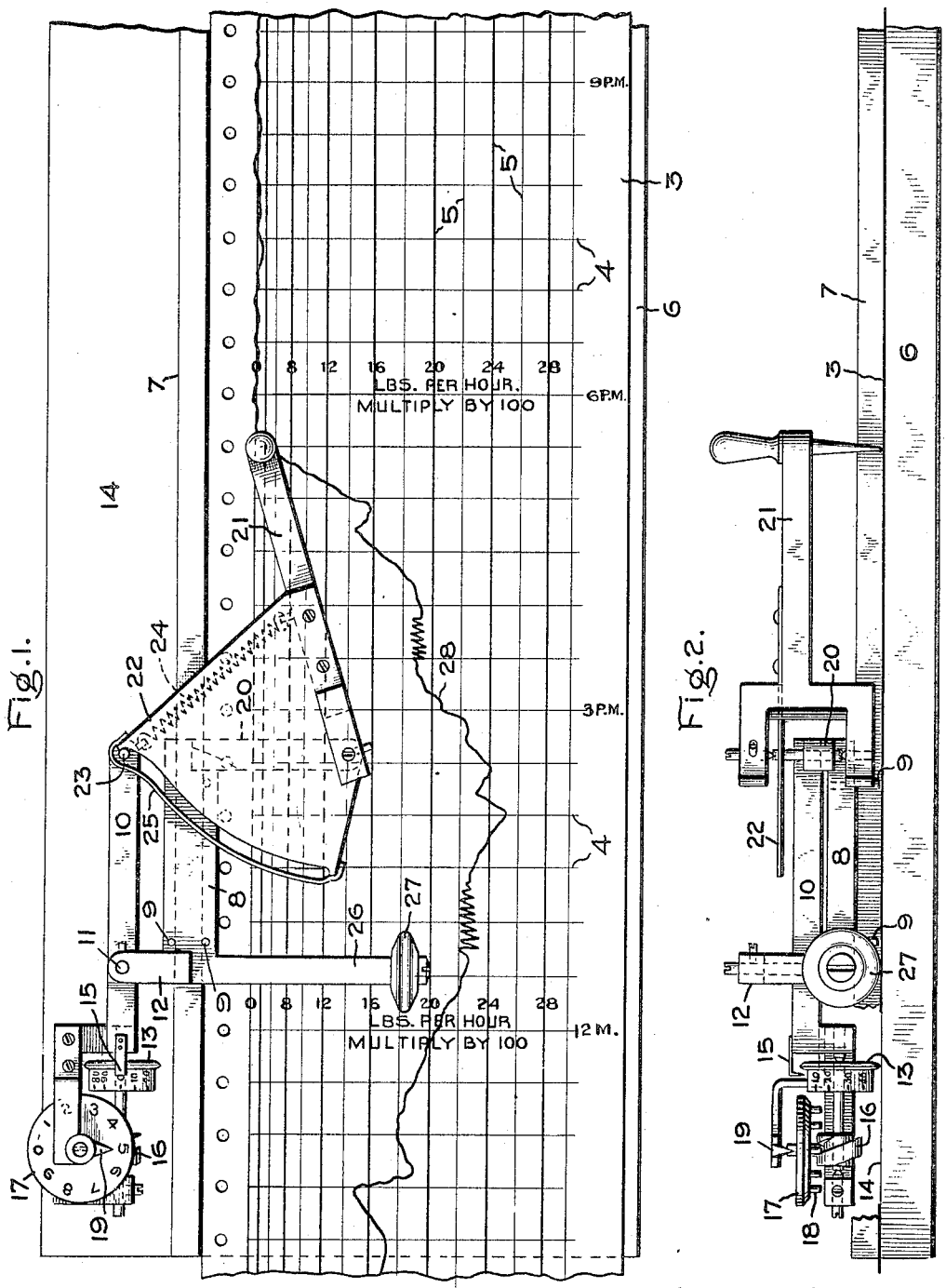

LUCIAN A. SHELDON, OF SCHENECTADY, NEW YORK, ASSIGNOR TO GENERAL ELECTRIC COMPANY, A CORPORATION OF NEW YORK.

PLANIMETER.

1,076,525.   Specification of Letters Patent.   Patented Oct. 21, 1913.

Application filed November 27, 1911. Serial No. 662,576.

*To all whom it may concern:*

Be it known that I, LUCIAN A. SHELDON, a citizen of the United States, residing at Schenectady, in the county of Schenectady, State of New York, have invented certain new and useful Improvements in Planimeters, of which the following is a specification.

This invention relates to planimeters for integrating or computing from a curve, diagram, or other figure, the area of said figure or some other value, according to the units in which the coördinates of the curve or diagram are expressed, and more particularly to planimeters for so measuring curves or diagrams whose coördinates are not proportional to their height or length.

The object of the invention is the provision of an improved instrument for measuring or integrating curves or diagrams having such nonproportional coördinates which facilitates the measurement, is relatively simple in construction and gives accurate results.

In the accompanying drawing illustrating one of the embodiments of the invention, Figure 1 is a top view of the planimeter and a portion of the diagram to be measured; and Fig. 2 is a side view of the planimeter with a portion broken away.

The planimeter is illustrated as used in measuring or integrating the flow of steam or other fluid as recorded by a flow meter on its chart or sheet 3, but obviously it can be used for measuring other records, diagams, etc. The abscissas of the chart are proportional to time and the vertical lines 4 representing time are equally spaced. The ordinates of the chart are proportional to the rate of flow and the horizontal lines 5 representing flow units are unequally spaced, the lines being closer together toward the top of the chart.

The sheet 3 is held on a base 6 by means of clamps or other suitable devices. The base has a flat upper surface to receive the sheet and it may be of any desired or convenient length. Secured to the base, preferably along one edge of the chart, is a bar or track 7. A carriage 8 is slidably mounted on the track and guided thereon by pins 9 or other suitable means. An arm 10 is pivoted at the point 11 to a projection 12 on the carriage. The arm carries at one end a rotatably mounted measuring wheel 13 that engages the surface 14 of the base. This surface is made of some material that affords a good uniform frictional contact between it and the wheel. The measuring wheel is graduated as shown and provided with a pointer 15 or an ordinary vernier. A helically grooved cam or gear 16 is mounted on the measuring wheel spindle and drives a counting wheel 17 by means of the pins or teeth 18, the counting wheel preferably moving through a distance equal to the pitch of the teeth for each revolution of the measuring wheel. A pointer 19 is employed to determine the extent of the movement of the wheel 17.

Pivoted to an arm or projection 20 on the carriage 8 is an arm 21 carrying a tracing point at its outer end. A cam 22 is secured to the arm 21, the edge of the cam being in engagement with a follower having the form of a pin or roll 23 mounted on the end of the arm 10. The follower 23 is kept in contact with the cam by a suitably arranged spring, such, for example, as the spring 24. A guard 25 may be provided to prevent accidental disengagement of the parts. Another arm or projection 26 extends outwardly from the carriage adjacent the pivot 11 and carries a wheel 27 at its outer end. This wheel runs over the surface of the chart and tends to steady the movement of the planimeter as the tracing point is moved along the flow line 28 and the carriage travels on its track.

The manner of operating the improved planimeter is similar to that of a standard planimeter. Starting from the zero line, the operator moves the tracing point over a time line until it intersects the flow line 28, the ordinates of which are proportional to the instantaneous rates of flow, then along the flow line for a distance corresponding to the length of time for which it is desired to integrate the flow, and then back to the zero line. Any other line parallel to the zero line may be used if desired, it only being necessary that the integration start and stop at the same line. If the record or chart is very long, it may be measured by dividing it into sections of about the length of the base 6 and then measuring one section after another. The result is indicated by the counting mechanism. As the tracing point is moved along the flow line, the cam 22 varies the inclination of the axis of the measuring wheel to the tracing arm 21 and the line of movement of the carriage in such a manner as to correct or compensate for the variations in the spacing of the lines 5 of the record sheet or chart. The shape of the cam will vary according to the spacing of said lines.

In accordance with the provisions of the Patent Statutes, I have described the principle of operation of my invention, together with the apparatus which I now consider to represent the best embodiment thereof; but I desire to have it understood that the apparatus shown is only illustrative and that the invention can be carried out by other means.

What I claim as new, and desire to secure by Letters Patent of the United States, is:—

1. A planimeter comprising a tracing arm, a measuring wheel, a support on which the wheel is mounted, means connecting the support and the tracing arm so that they can move relatively to each other, and means including a cam carried by the tracing arm for varying the angular relation of the axis of the wheel and said arm.

2. A planimeter comprising a pivotally mounted tracing arm, means for supporting the pivot of said arm and guiding it in a rectilinear path, a measuring wheel, a support for the wheel that is pivotally connected to said means, and means including a cam on the tracing arm for varying the angular relation of the axis of the wheel and said arm.

3. A planimeter comprising a carriage, means for causing the carriage to follow a definite path, a tracing arm, a meausring wheel, an arm on which the measuring wheel is mounted, means connecting the arms to the carriage so that they are angularly movable relative to each other, and a cam moved by one of said arms for controlling their angular relation.

4. A planimeter comprising a carriage, means for guiding the carriage in a rectilinear path, a tracing arm, a measuring wheel, an arm on which the measuring wheel is mounted with its axis arranged longitudinally of the arm, means connecting the arms to the carriage so that they are angularly movable relative to each other, and a cam on the tracing arm for varying the angular relation of the arms.

5. A planimeter comprising a carriage, means for guiding the carriage in a rectilinear path, a pivotally mounted tracing arm carried by the carriage, a measuring wheel, means pivotally connected to the carriage on which the wheel is rotatably mounted, and a cam on the tracing arm that acts on said means to vary the angular relation of the axis of the wheel to the tracing arm.

6. A planimeter comprising a carriage, means on which the carriage is mounted and caused to move over a definite path, a tracing arm pivoted to the carriage, a second arm pivoted to the carriage, a measuring wheel mounted on the second arm, and cam mechanism for transmitting motion between the two arms.

7. A planimeter comprising a carriage, means for guiding the carriage in a rectilinear path, a tracing arm pivoted to the carriage, a second arm pivoted to the carriage, a measuring wheel mounted on the second arm, and a cam carried by the tracing arm that engages the other arm and moves it about its pivot under certain conditions.

8. A planimeter comprising a carriage, a track on which the carriage is guided, a tracing arm pivoted to the carriage on one side of the track, an arm pivoted to the carriage on the other side of the track, a measuring wheel mounted on the second arm, and means for transmitting motion from one arm to the other.

9. A planimeter comprising a carriage, a track on which the carriage is guided, a tracing arm pivoted to the carriage on one side of the track, an arm pivoted to the carriage on the other side of the track, a measuring wheel mounted on the second arm, a cam moved by the tracing arm that engages the other arm, and spring means that holds the arm and cam in engagement with each other.

10. A planimeter comprising a base, a carriage, a track on which the carriage is guided in a rectilinear path, a tracing arm pivoted to the carriage on one side of the track, an arm projecting from the carriage on the same side of the track, a wheel rotatably mounted on the end of the second arm that is adapted to run over the base, an arm pivoted to the carriage on the opposite side of the track, a measuring wheel mounted on the last arm, a follower mounted on the arm, a cam carried by the tracing arm that engages the follower, and a spring for keeping the follower in contact with the cam.

11. A planimeter comprising a carriage, means on which the carriage is mounted and caused to follow a definite path, a tracing arm pivoted to the carriage, a counting mechanism pivotally connected to the carriage, said mechanism including a measuring wheel, and means for varying the angular relation of the axis of the wheel and the tracing arm as said arm is moved.

12. A planimeter comprising a movable support, a tracing arm pivotally connected to the support, a measuring wheel, a support on which the wheel is mounted, said support being pivotally connected to the first support, and a cam that is actuated by the tracing arm for varying the angular relation of the wheel support and said arm.

13. The combination of a supporting means, a tracing arm that is pivotally mounted on the supporting means, a counting mechanism pivotally connected to said means and including a measuring wheel, and means including a cam for varying the angular relation of the axis of the wheel and the arm as said arm is moved.

In witness whereof, I have hereunto set my hand this 25th day of November, 1911.

LUCIAN A. SHELDON.

Witnesses:
HELEN ORFORD,
BENJAMIN B. HULL.